Patented Apr. 27, 1943

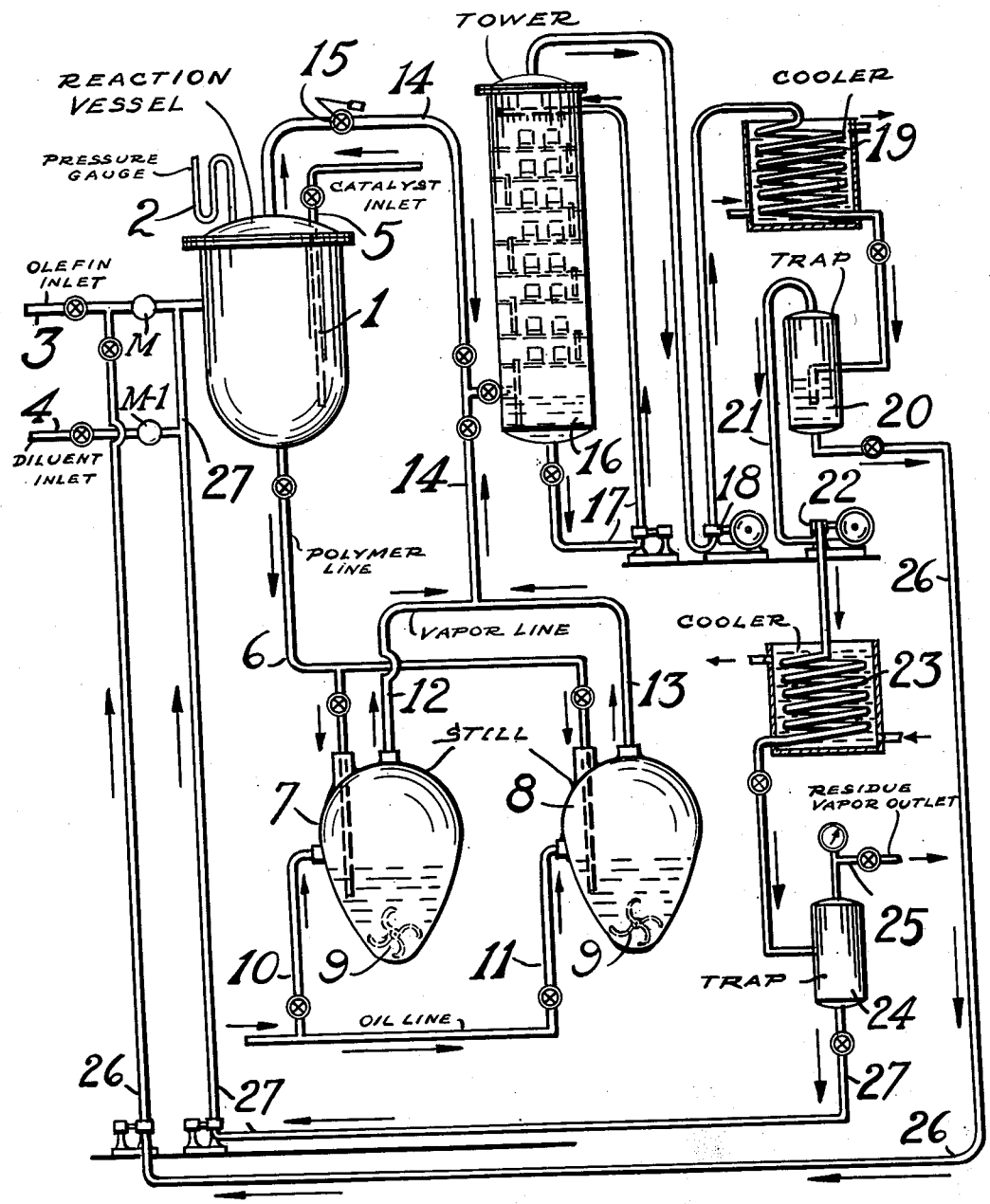

2,317,878

UNITED STATES PATENT OFFICE 2,317,878

METHOD OF PRODUCING POLYMERS OF HIGH MOLECULAR WEIGHT

Lewis A. Bannon, Roselle, N. J., assignor, by mesne assignments, to Jasco, Incorporated, a corporation of Louisiana Application October 10, 1936, Serial No. 105,006

5 Claims. (Cl. 260—94)

The present invention relates to an improved process for producing valuable hydrocarbons and other polymers of high molecular weight which are useful in thickening lubricating oils and improving their viscosity and temperature characteristics, that may also be used for other purposes. The invention will be fully understood from the following description and the drawing:

The drawing is a semi-diagrammatic view in sectional elevation of an apparatus for continuously producing high molecular weight polymers.

It has been previously known that olefins, and particularly isobutylene, could be polymerized at low temperatures, below, say, —10 or —20° C., by means of active halide catalysts to produce high molecular weight polymers. These polymers differ from polymers produced at elevated temperatures by the fact that they are linear in structure and that they are characterized by remarkable properties, entirely different from the lower polymers such as the dimers, trimers, tetramers, and the like. The molecular weight of these products vary from, say, 1,000 or 2,000 to 50,000 or 100,000 and even 250,000. The particular molecular weight obtained depends on the character of the olefins polymerized, purity, the particular catalyst used, and the temperature employed. The lower the temperature, the higher the molecular weights that can be obtained. Other things being equal, and greater purity of the olefins, i. e. from sulfur or oxygenating materials, also tends to increase the molecular weights.

Heretofore it has been the practice to produce these polymers in a batch process. The olefin to be polymerized is brought into a reaction zone in liquid condition with a diluent. Experience has shown that about two parts of diluent are required to one part of the olefin to be polymerized. The catalytic agent is added to the liquid material through a spray pipe or the like. Ordinarily the reaction zone is maintained at a low temperature by adding solid carbon dioxide or other refrigerants directly to the reaction zone. The preferred catalyst for this reaction has been boron fluoride, which is a gaseous substance; and it has been previously the practice to conduct this material into the isobutylene to be polymerized through a spray pipe. Reaction occurs with almost explosive violence accompanied by long evolution of heat which raises the temperature very rapidly unless large cooling capacity is available. Under these conditions the reaction time is very short. It is ordinarily a matter of very few minutes before the polymer is formed in a thick mass which immediately coalesces and adheres strongly to the sides of the metal vessel. It is necessary to raise the temperature and dissolve the polymer in a suitable solvent such as naphtha before it can be removed from the vessel, and as will be appreciated, the reaction time consumes a very short portion of the production cycle, so that for a given size reaction zone, the throughput or polymer produced is quite small.

Now it has been found that much better results can be obtained by conducting the reaction in a different manner; namely, by maintaining a bath of solvent in a reaction zone charged with the catalyst in solution, or at least in a dispersed condition, and injecting into this body the isobutylene to be polymerized, preferably in liquid phase and continually or at short intervals withdrawing the polymer suspended in the diluent. In this way the amount of the isobutylene undergoing polymerization at one time is very small, by less than ⅓ the amount of diluent present, and the reaction can be very readily controlled, and the heat of reaction dissipated without rise in temperature. The reaction time is probably the same as before, but the operation may be continued practically indefinitely if diluent, catalyst and olefin are continuously supplied at the required rate. In this way, a much greater degree of control can be exerted over the process. Furthermore, the heat of reaction, which is very great, as noted above, can be dissipated readily, so that a practically uniform temperature is maintained throughout without local zones of increased temperature, with the result that a much more uniform and desirable product is obtained.

The most advantageous feature of the method, however, lies in the condition in which the polymer is produced. In the former method, where the catalyst was added to the liquefied isobutylene, polymerization occurred almost instantaneously, and the product formed in a solid or semi-solid mass. In the present method the polymer is produced in discrete particles, which under the low temperature show little or no tendency to coalesce. In fact, the dispersion of these discrete particles may be maintained for a relatively long period at the low temperature without coalescence by the violent agitation of the reactor, although it is desirable to increase this by stirring, especially in large reactors. The practical result of this advantageous form is that the material can be withdrawn from the reaction vessel with a minimum of loss of reaction time; and where previously one batch of the polymer could be produced in about one hour by application of the present ideas, the same size reactor is capable of producing 5 to 10 times as much in the same time.

Referring to the drawing, number 1 denotes a reaction vessel in which the polymerization takes place. The vessel should be made to withstand considerable pressures for the sake of safety, although the process itself is ordinarily carried out with good results at substantially atmospheric pressure. The vessel may be fitted with a suitable cooling jacket or covered with lagging, neither of which are shown. There is a pressure gauge 2 conveniently in the form of a mercury-filled monometer, which serves not only as a gauge but as a relief valve as well.

The olefin to be polymerized, isobutylene for example, is forced into the reactor in liquid state by means of a pipe 3, and passes through a meter M. A suitable diluent, such as saturated hydrocarbon or ethylene, which is not reactive under the conditions to be employed, is added to the vessel by means of pipe 4. The diluent likewise passes through a meter M—1, and may join pipe 3 before entering the reaction vessel, as indicated in the drawing.

Pipe 5 leads to the bottom of the reaction vessel and carries the catalyst, which is in fluid form—preferably gaseous, to the lower part of the reaction vessel. Stirring devices may be used, but it is preferred to carry out the reaction at the boiling temperature of the contents of the vessel, and it is found that the boiling itself brings about sufficient agitation for the purpose at hand.

An exit pipe 6 leads from the base of the reaction vessel and carries the polymer in a suspended form out of the reaction vessel and into one or the other of two stills, 7 and 8. These stills are fitted with kneading arms, 9, in the bottom of the still, which is preferably shaped as shown, so that the kneading may be accomplished effectively. The stills may be heated with steam, if a relatively high boiling diluent is used, but where liquefied normally gaseous hydrocarbons are employed, no heat need be added. Oil may be added to the stills by lines 10 and 11, if it is desired to recover the polymer dissolved in a heavy oil, but these oil lines need not be used if the polymer is to be recovered in a solid condition. Vapors pass from the stills by lines 12 and 13, as the case may be, to the recovery system which will be described below. The stills are fitted with suitable manholes, not shown, so that the polymer may be conveniently removed. If desired, the stills may be in an elongated form, fed at one end, and the kneading devices may be in the form of a screw conveyor, so that the polymer is freed of gases and discharged at the opposite end. In such a case only one still is required.

Returning to the reaction vessel 1, a line 14 is provided in the head of the vessel to remove vapors. This line is fitted with a pressure valve 15, which may be set to hold any desired pressure. Thus it will be seen that by choosing a suitable pressure, the reaction vessel may be automatically maintained at any chosen temperature. With liquid ethylene as the diluent and a pressure of substantially atmospheric, the reaction vessel will assume a temperature of −103° C. By increasing the pressure or selecting a higher boiling diluent, a higher temperature may be obtained. The vapors passing through line 14 consist chiefly of the diluent and the catalyst, if a gaseous catalyst such as boron fluoride is used. A certain part of the olefin being polymerized is likewise removed.

Vapors from the stills 7 and 8 are discharged by lines 12 and 13 into line 14, so that a single recovery system may be used. The combined gases pass into a tower 16, through which caustic soda, soda ash, or other alkali, is circulated by means of line 17, and all traces of catalyst is removed from the gas in this way.

The purified gases pass to a compressor 18, cooler 19, and a trap 20, in which the high boiling materials are condensed. The remaining vapor passes by line 21 to a second compressor 22, cooler 23, and trap 24. The residual vapor is finally taken off by pipe 25. The liquefied portions collected in the traps 20 and 24 respectively are conducted by lines 26 and 27 to lines 4 and 3 respectively, so that the diluent and the olefin to be polymerized are returned to the reactor for reuse.

The above method is applicable especially to the manufacture of polymers from isobutylene, but it will be understood that other materials may be polymerized in the same manner, for example, isoprene, styrene, indene and the like. It is particularly advantageous in producing polymers of extremely high molecular weight, which products are substantially solid and have a rubber-like appearance. They are characterized by molecular weights of the order of 50,000 and above, but it will be understood that lower molecular weight polymers can also be produced, for example, from 2,000 to 10,000 or higher.

As solvents, or diluents, for the above process, volatile liquid hydrocarbons are preferred, for example, ethane, propane, butane or mixtures thereof. Ethylene may also be used because it is not reactive under these conditions, but it is preferred to avoid the use of lighter single olefins. If desired higher boiling saturated aliphatic hydrocarbons may be employed, but it is more desirable to use the lower hydrocarbons, especially those boiling below isobutylene, since this furnishes a convenient method for maintaining control of the temperature, as disclosed above. Any suitable temperature below −10° C. may be maintained by choosing a hydrocarbon diluent or solvent mixture of the proper boiling range, and further adjusting the pressure. The reaction is conducted under a suitable pressure or vacuum so that the solvent boiling under the predetermined pressure automatically holds the desired temperature, which may be as low as −40° C. to −150° C.

While any of the active halide catalysts may be used, such as aluminum chloride, boron fluoride is particularly desired because of the fact that it is gaseous and evaporates without leaving a sludge. While the active halide catalysts are generally known as a class, the preferred members are aluminum chloride, zinc chloride, boron fluoride, and titanium fluoride. Organic complexes of these halides and double halides may also be used.

The following example illustrates the method of carrying out the present invention and the advantages thereof:

The first run was conducted in batch to illustrate that method of operation and to likewise illustrate its disadvantages. To the reactor is added 1.25 gallons of isobutylene and 2 gallons of liquefied ethylene. The pressure is maintained at a definite point, about .5 inch of mercury, so that the temperature at equilibrium was about —103° C. 1½ gallons of liquefied ethylene containing a small amount of boron fluoride was rapidly added to the reactor. The amount of catalyst was estimated at .2% of the isobutylene present.

The reaction occurred with explosive violence, the pressure mounting violently and blowing the gauge. The isobutylene polymerized rapidly within a few seconds and formed a solid lump of about 6½ lbs. Samples taken from different portions of the reactor were examined and found to vary greatly in molecular weight. The extremes were from 88,000 to 144,000. The total time, including the time for removal of the polymer, required before a new batch could be charged to the reactor was about 1 hour. In a series of seven batch runs made in substantially the same manner, the average molecular weight of the polymer varied from about 85,000 to 145,000.

To compare with the above runs, the reactor was first filled with 3½ gallons of liquefied ethylene containing a small amount of boron fluoride, estimated to contain about .18% by weight of the ethylene. Liquefied isobutylene was then continuously forced into the reactor at a rate of about 1 gallon per hour. Liquid ethylene was also added at a rate of 3 to 4 gallons per hour, along with boron fluoride amounting to .2% by weight of the isobutylene. The reaction temperature was automatically held at −103° C. by adjusting the pressure on the reaction mixture, which boiled smoothly and steadily. After about one hour the reactor was found to contain a mixture of which 20% was polymer in the form of small discrete particles. These particles showed no tendency to coalesce or to settle under the conditions prevailing in the reactor.

At this time the reactor contained about 5 gallons of the suspended polymer and continuous withdrawal was begun and continued at a rate such as to keep the level within the reactor about constant. For two successive hours the conditions were held quite uniform, the reactor being fed as above and the polymer being withdrawn without any difficulty. Samples were taken from time to time showing that the accurate control of the reactor produced a much more uniform reaction. The molecular weight of the samples taken did not differ more than 1000 in a total molecular weight of 149,000.

The capacity of the reactor was not reached during the run, but it was found that the amount of polymer could be produced at a rate of 3 to 5 times as great in a continuous process as had previously been produced in the batch process, and it was estimated that the rate could be increased so that in the same size reaction vessel the continuous process would produce from 10 to 20 times as much polymer as could be produced during the same time in a batch process.

Further experiments also demonstrated that the batch method did not permit accurate temperature control because of the fact that the reaction was so extremely rapid and the evolution of heat was so very great under these conditions. The variation in the molecular weight of the polymer was very much less in the continuous process than in the batch method, and in the latter process a large reaction vessel is required because of the tendency to foam, but this did not apparently occur during the continuous process.

In the batch process a solid lump was formed which contained gas pockets of unreacted olefin and diluent. This material adhered very strongly to the steel walls of the vessel and can be removed from the walls with great difficulty by scraping with a knife or other similar implement. In the continuous process, however, the polymer was obtained as indicated above in small discrete particles which showed no tendency to coalesce. They did not adhere to the side walls of the vessel and contained much less unpolymerized olefin, diluent and traces of catalyst.

The present invention is not to be limited by any theory of the reaction or to the polymerization of any particular olefin, nor to the use of any particular diluent or cooling method, but only to the following claims in which it is desired to claim all novelty inherent in the invention.

I claim:

1. In a process of polymerizing liquefied isobutylene to form high molecular weight polymers, the improvement which comprises dissolving a boron fluoride catalyst in an inert liquefied normally gaseous diluent which boils at the desired polymerization temperature, commingling said diluent containing the catalyst initially with a smaller proportion of liquefied isobutylene in a polymerization reaction zone wherein said diluent is boiled at below the boiling point of the isobutylene, polymerizing the said isobutylene into discrete particles as a fluid slurry of polymer particles in diluent, continuously removing vapors of the boiled diluent from said reaction zone to maintain the desired operating pressure and temperature therein, continuously withdrawing said slurry of polymer particles, continuing to add to the reaction zone liquefied isobutylene and a larger proportion of the diluent along with a small amount of catalyst as polymerization of the isobutylene proceeds to replace catalyst lost and to replace the diluent withdrawn so as to maintain a considerably larger proportion of liquefied diluent than liquefied isobutylene in the reaction zone.

2. The improvement in a process of continuously polymerizing liquefied isobutylene into high molecular weight polymers, which comprises continuously introducing liquefied isobutylene into a reaction zone containing a larger proportion of a more volatile liquefied normally gaseous diluent which is non-reactive and boils at the desired polymerization temperature and contains a small amount of dissolved boron fluoride polymerization catalyst, polymerizing the said isobutylene by the action of the said boron fluoride into discrete particles of solid polymer to form a fluid slurry of polymer particles in diluent, continuously withdrawing vapors of the boiling diluent from the reaction zone to maintain the desired polymerization pressure and temperature in the reaction zone, continuously adding to the reaction zone a larger proportion of the diluent than of the liquefied isobutylene to replace the diluent withdrawn as polymerization of the isobutylene proceeds, and continuously withdrawing from the reaction zone a slurry of isobutylene polymers dispersed as discrete solid particles in the liquid diluent.

3. The improvement in a process of polymerizing liquefied isobutylene with boron fluoride as the catalyst to form isobutylene polymers having molecular weights of the order of 50,000 and above, which comprises continuously introducing into a reaction zone liquefied isobutylene wherein the liquefied isobutylene is mixed with at least about three times its volume of liquefied ethylene containing the boron fluoride catalyst, maintaining a reaction temperature of about −103° C. in the reaction zone by boiling of the liquefied ethylene, polymerizing the said liquified isobutylene into solid discrete particles of polymer having a molecular weight above 50,000, as a slurry in the said liquefied ethylene, continuously removing vapors of the boiled ethylene from said reaction zone to maintain the reaction temperature, removing the said polymer as a fluid slurry of solid polymer particles in liquid ethylene and continuously introducing into the reaction zone liquefied ethylene along with a small amount of the catalyst to maintain the proportion of at least three times as much liquefied ethylene as liquefied isobutylene, and to maintain sufficient catalyst in the liquefied ethylene within the reaction zone.

4. The improvement in a process for producing valuable polymers of high molecular weight from liquefied isobutylene, which comprises maintaining a lower boiling normally gaseous hydrocarbon in liquefied condition at its boiling point substantially below −10° C. with a small amount of an active metal halide polymerization catalyst therein, said lower boiling hydrocarbon being substantially non-reactive under the isobutylene polymerization conditions, polymerizing the isobutylene into solid particles of polymer as a slurry in the liquefied hydrocarbon, continuously removing said polymer as a fluid slurry in the hydrocarbon, continuously admixing with said lower boiling hydrocarbon in liquefied condition a considerably smaller amount of liquefied isobutylene, continuously removing vapors of said lower boiling hydrocarbon from the reaction mixture as the isobutylene is polymerized therein, and continuously replenishing said lower boiling hydrocarbon in liquefied condition in the reaction mixture.

5. The improvement in a process of continuously polymerizing liquefied isobutylene with boron fluoride as the catalyst into high molecular weight polymers in the form of small, solid, discrete polymers, which comprises initially bringing together in a polymerization reaction zone liquefied isobutylene with a larger proportion of a lower boiling liquefied hydrocarbon diluent containing the catalyst, said diluent being non-reactive in the process and boiling in the range of −10° C. to about −103° C., polymerizing the isobutylene by the agency of the boron fluoride into the said discrete particles as a slurry in the said diluent, maintaining in the reaction zone a uniform, constant temperature at substantially the boiling point of the diluent under approximately atmospheric pressure by removing vapors from the reaction zone, continuously introducing into the reaction zone liquefied isobutylene and a larger amount of liquefied diluent along with additional catalyst as polymerization of the isobutylene proceeds, and withdrawing from the reaction zone a slurry of polymers dispersed as small, discrete, solid particles in liquefied diluent.

LEWIS A. BANNON.